US006947609B2

(12) United States Patent
Seeger et al.

(10) Patent No.: US 6,947,609 B2
(45) Date of Patent: Sep. 20, 2005

(54) SYSTEM WITH MOTION TRIGGERED PROCESSING

(75) Inventors: Mauritius Seeger, Royston (GB); Stuart A. Taylor, Cambridge (GB); Christopher R. Dance, Cambridge (GB)

(73) Assignee: Xerox Corporation, Stamford, CT (US)

( * ) Notice: Subject to any disclaimer, the term of this patent is extended or adjusted under 35 U.S.C. 154(b) by 612 days.

(21) Appl. No.: 10/086,802

(22) Filed: Mar. 4, 2002

(65) Prior Publication Data

US 2003/0165276 A1 Sep. 4, 2003

(51) Int. Cl.[7] .................................................. G06K 9/64

(52) U.S. Cl. ....................... 382/278; 382/107; 382/282; 382/312; 358/486; 358/496

(58) Field of Search ................................ 382/107, 112, 382/113, 135, 137, 236, 278, 282, 312; 358/1.5, 505, 474, 488, 496, 497, 452, 486

(56) References Cited

U.S. PATENT DOCUMENTS

| | | | | |
|---|---|---|---|---|
| 5,511,148 A | | 4/1996 | Wellner | |
| 5,610,720 A | * | 3/1997 | Fujioka et al. | 358/296 |
| 5,649,026 A | * | 7/1997 | Heins, III | 382/175 |
| 5,736,725 A | | 4/1998 | Danielson | |
| 5,764,379 A | * | 6/1998 | Matsuda et al. | 358/474 |
| 5,834,762 A | * | 11/1998 | Matsuda et al. | 250/208.1 |
| 5,835,663 A | * | 11/1998 | Momochi | 386/61 |
| 6,178,270 B1 | | 1/2001 | Taylor et al. | |
| 6,323,963 B1 | * | 11/2001 | Takahashi | 358/474 |
| 6,697,536 B1 | * | 2/2004 | Yamada | 382/275 |

OTHER PUBLICATIONS

Philips Vesta Pro Scan PCVC609K, Pagecam 2.1 User Guide, Sep. 2000.

William Newman et al., “Cam Works: A Video–based Tool for Efficient Capture from Paper Source Documents,” Proceedings of the International Conference on Multimedia Computing and Systems, vol. 2, pp. 647–653, Jun. 1999.

* cited by examiner

*Primary Examiner*—Bhavesh M. Mehta
*Assistant Examiner*—Yosef Kassa
(74) *Attorney, Agent, or Firm*—Oliff & Berridge, PLC

(57) ABSTRACT

A document image capture (scanning) system and control method are described for scanning and processing document images received live from a camera. A motion detector detects image motion between two image frames. When the image is stationary, image processing (such as OCR) is carried out automatically and made available to the operator. In one form, when movement is detected, the image processing results are discarded until the image is newly stationary, whereupon new image processing is carried out on the new image. In another form, the degree of movement is evaluated; if the movement is small, then at least some of the previous image processing results are re-used by re-mapping on to the new image.

20 Claims, 5 Drawing Sheets

SYSTEM WITH MOTION TRIGGERED PROCESSING

BACKGROUND OF INVENTION

The present invention relates to a method and to apparatus for capturing digital images of documents. In particular, the invention relates to a method for controlling the capture and processing of the document images.

FIG. 1 illustrates an example of a typical conventional document image scanner 10 of the type using a digital camera 12. The camera 12 is supported above a document 14, and the output from the camera 12 is fed to a computer 16 for display and processing of the captured image. The computer 16 contains an image buffer for storing an input image frame.

FIG. 2 illustrates typical operating modes of the scanner 10. The scanner includes a "live" mode 20 in which a live image is continuously input into the buffer and is displayed on the VDU (Video Display Unit) of the computer 16. The scanner also includes a "frozen" mode 22 in which the image in the buffer is frozen, and the frozen image is displayed. In the frozen mode 22, the image can be processed, for example, to determine the boundaries of text and image areas, and to perform Optical Character Recognition (OCR) on text areas. Generally, it is not practical to process the image in the "live" mode, since the processing operations are computationally slow relative to the incoming image frame rate.

When in use, the operator manually controls the operating mode of the document image scanner 10. The operator selects the "live" mode for viewing the document during positioning (to ensure that the desired document area is within the field of view of the digital camera 12). The operator then switches the scanner to the "frozen" mode, to freeze the image and to process the frozen image.

However, such a scanner necessarily suffers from a delay after the operator has switched to the frozen mode, until the image analysis and processing has been completed. A further disadvantage is that it is unintuitive to the operator to have to manually freeze the image before it can be processed. Moreover, it is inconvenient to have to switch back from the frozen mode to the live mode when a new document is to be positioned in front of the camera. It would therefore be desirable to provide a system that does not suffer from these limitations.

SUMMARY OF INVENTION

In accordance with the invention, there is provided a system and method therefor for automatically detecting whether a document image is being moved in the field of view of a camera, or whether the image is stationary, and to control a scanner (image capture) system in response to the detection result.

If the system determines the document image is stationary, then the document image is suitable for processing (e.g., OCR) to extract information from the document image. In accordance with one aspect of the invention, in response to the detection of a stationary document image, image processing is started automatically.

If the system determines the document image is moving, then the document image is not suitable for processing, since the processing is generally too slow to keep up with the incoming frame rate. In accordance with another aspect of the invention, when movement is detected, the image processing is not carried out simultaneously.

In accordance with yet another aspect of the invention at least some processing results are re-used that were obtained from a first (or previous) image frame, for a new (or subsequent) image frame which contains at least some of the same image as the first (or previous) frame. By re-using at least some of the previous processing results, the amount of processing required for the new image can be reduced.

In one operational mode of the invention, displacement between two image frames is detected, and previous processing results are mapped to the new position for the new image frame. In another operational mode of the invention, additional processing is carried out on any new document regions which exist in the new frame but which were not present in the first or previous frame. The new processing results are then combined with the re-used results for the regions common to both frames, to provide complete processing results for the new frame.

The advantages provided by the invention include: automated capture of document images without the operator having to switch manually from a live mode to a frozen mode; similar automatic processing of document images (e.g., for OCR) at an earliest opportunity, in order to minimize the delay experienced by the operator; automatic re-use of processing results from a previous image, where appropriate, in order to reduce the processing time required to re-process an image after relatively small movement of the document in the field of view of the camera.

BRIEF DESCRIPTION OF DRAWINGS

These and other aspects of the invention will become apparent from the following description read in conjunction with the accompanying drawings wherein the same reference numerals have been applied to like parts and in which.

DETAILED DESCRIPTION

Figure 3:
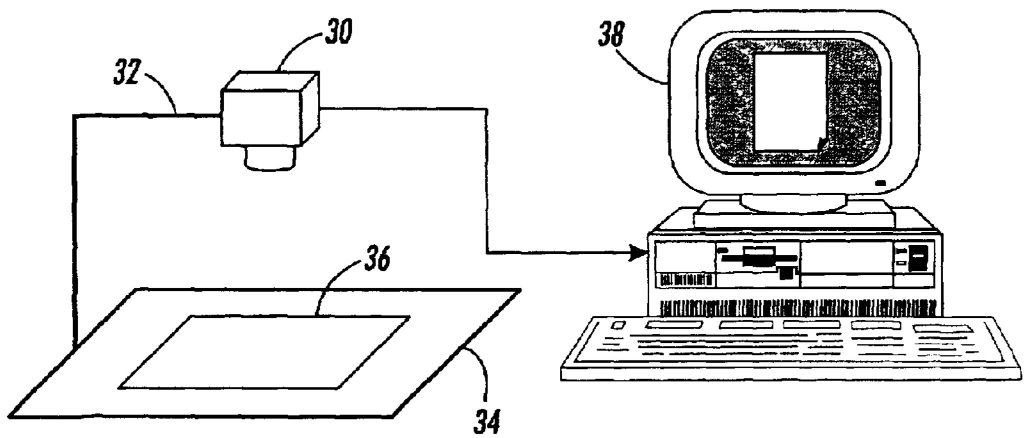
FIG. 3 is a schematic view of an embodiment of a document scanning system incorporating the present invention.

Referring to FIG. 3, a document scanner system comprises a digital camera 30 that is positioned above a surface 34 on which a document 36 to be scanned is placed. For example, the camera 30 may be mounted above the surface using a stand 32. The output from the camera is coupled to a computer 38 for displaying and processing the image. Alternatively, the camera 30 may comprise a video camera coupled to an analog-to-digital image converter.

Figure 4:
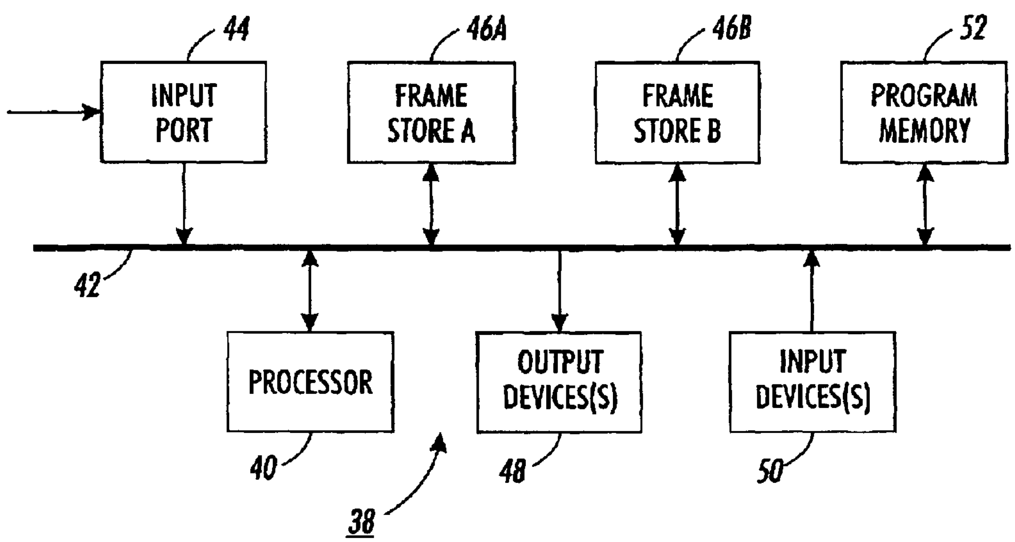
FIG. 4 is a schematic block diagram showing components of the computer of FIG. 3.

Referring to FIG. 4, the computer 38 includes a processor 40 coupled to various components by a main bus 42. The components include an input port 44 for receiving the digital data from the camera, and first and second frame buffers 46A and 46B each capable of storing an image frame. The components also include other devices commonly found in computers, such as a video output device 48, and a keyboard and/or pointing input device 50. The computer includes a memory 52 for storing a control program executable by the processor 42 to carry out the image display and processing functions described below.

The first and second frame buffers 46A and 46B may be implemented in the conventional memory (RAM) of the computer 38, or by storage areas or files in a conventional mass storage device of the computer. Such components are not shown specifically in FIG. 4; however, it will be appreciated by those skilled in the art that such components will normally be present in the computer 38. Alternatively, the first and second frame buffers 46A and 46B, and the input port 44 could be provided on a dedicated peripheral board coupled to the main bus 42 of the computer 38.

One of the features of this embodiment is that the control program for the processor 40 includes a motion detection module 58 (shown in FIGS. 5–7) for comparing the images stored in the first and second frame buffers 46A and 46B to determine whether there is any movement in the image (i.e. image displacement from one frame to another). Detected motion, or lack of motion, is then used to control how the image is displayed and processed, without the user having to manually "freeze" or "unfreeze" the current live camera image.

In one embodiment, motion is detected by updating the contents of one of the frame buffers 46A and 46B, and comparing the pixel values between the contents of the frame buffers 46A and 46B. In one implementation, the images are normalized for lighting conditions, by subtracting a local average of the ambient light. In order to detect motion, the contents of the two frame buffers 46A and 46B are compared to determine whether an image shift occurred. Image shifts between the frame buffers 46A and 46B having a magnitude larger than a predefined threshold are detected and the presence of motion indicated.

It will be appreciated by those skilled in the art that various other techniques may be used for detecting motion such as: (a) computing the magnitude of difference between consecutive frames; (b) computing the magnitude of difference between blurred or dilated/eroded images, to detect only larger motions; (c) using correlation to find maximum correlation translation (or other transformation) between frames; (d) using versions of techniques (a)–(c) applied to binarized images, or otherwise transformed images (e.g., wavelet encoded images); (e) measuring optical flow using spatial and temporal derivatives to infer motion; (f) using versions of techniques (a)–(e) employing more than two consecutive frames, operating on sub-regions of images, or combining several of techniques (a)–(e); or (g) non image-based motion sensors (e.g., pressure sensors in the surface on which the document is resting). Details of these and other operations are described in more detail in "Digital Video Processing" by M. Tekalp (Prentice Hall, 1995, ISBN 0-13-190075-7), which is incorporate herein by reference.

Figure 1:
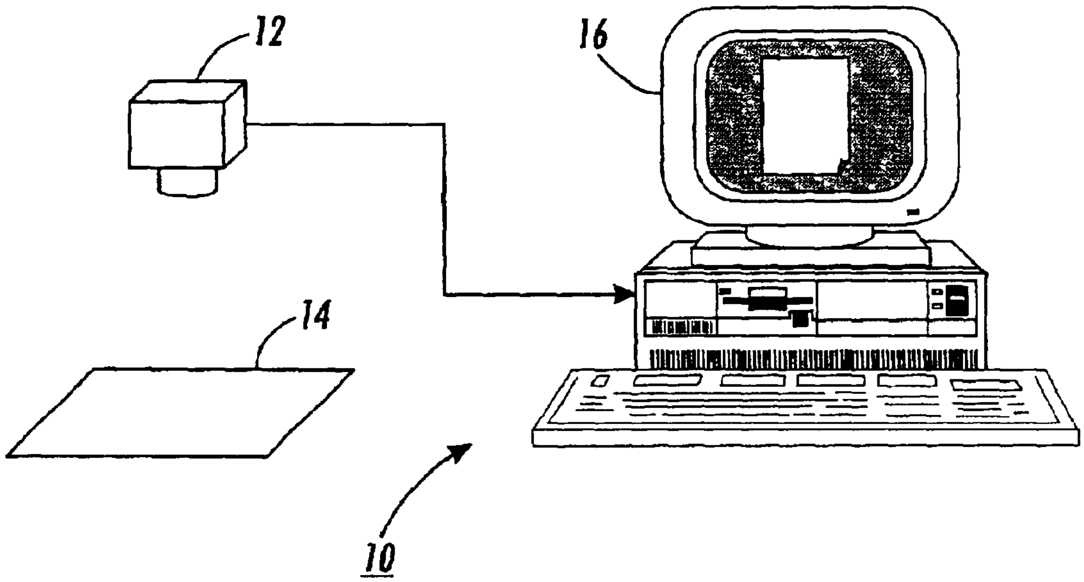
FIG. 1 is a schematic view of a conventional document scanning system using a digital camera.
Figure 2:
FIG. 2 is a schematic diagram illustrating the operating modes of the conventional system of FIG. 1.
Figure 5:
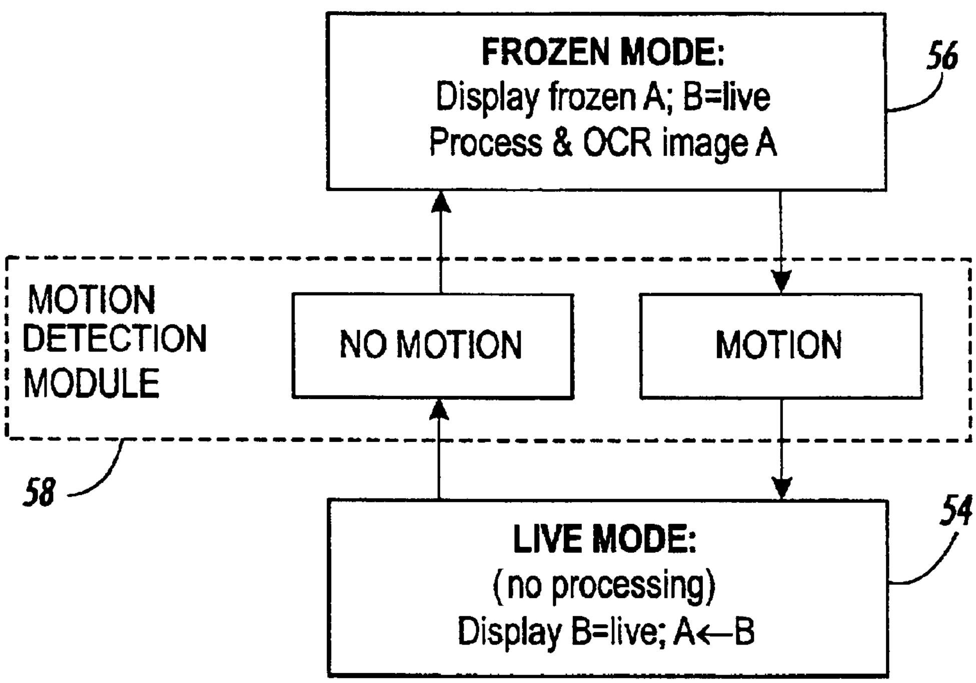
FIG. 5 is a schematic diagram illustrating the operating modes in a first processing control method of the system of FIG. 3.
Figure 6:
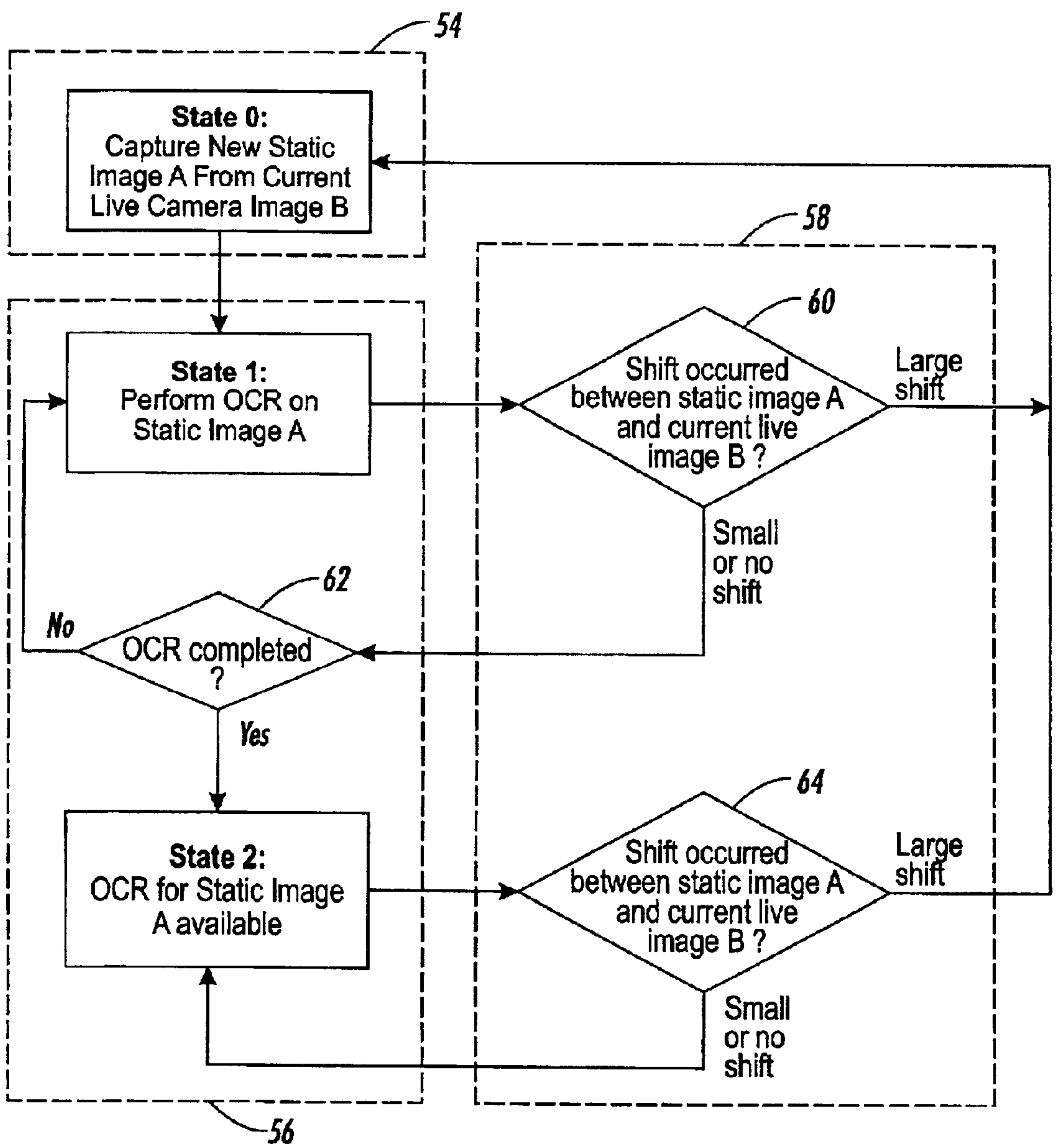
FIG. 6 is a schematic diagram illustrating the operating states in the first processing control method of FIG. 5.

FIG. 5 illustrates the principles of a first control method for controlling the image capture system, and FIG. 6 illustrates the functional operating states (labeled states 0, 1 and 2) of this method. As shown in FIG. 5, the scanning system has two operating modes similar to those described previously in relation to FIG. 2, being a "live" mode 54, and a "frozen" mode 56. The system switches automatically between the modes in response to detected motion of the image by the motion detection module 58. As shown in FIGS. 5 and 6, the live mode 54 includes state 0 and the frozen mode 56 includes states 1 and 2.

Referring now to FIG. 6, the system is initialized to state 0. In state 0, a new static image A is captured from the current live camera image B. Once a first (or a new) static image A is captured in state 0, a transition is made to state 1 where OCR is performed on the static image A. In alternate embodiments, other types of image processing may be performed in addition to or in place of OCR at state 1 including: (a) binarization; (b) document image segmentation (e.g., techniques that find columns, pictures, words, or other image objects); (c) image archival to an image history or database; (d) image mosaicing (which is described in more detail below); (e) language translation; or (f) combinations of (a)–(e).

While image processing is performed at state 1, a query is periodically made after a predefined interval at diamond 60 of the motion detection module 58. The query may be made in parallel or in sequence (i.e., concurrently) with the processing performed at state 1. At diamond 60, a determination is made using the image comparison technique described above whether a shift occurred between the static image A and the current live image B. If a large shift is identified as having occurred at diamond 60 then state 0 is repeated; otherwise, diamond 62 is evaluated in frozen mode 56.

At diamond 62, state 1 resumes its image processing being performed if it has not yet completed; otherwise, if image processing has completed at diamond 62, then a transition is made to state 2 of the frozen mode 56. At state 2, the completed processed image (e.g., OCR image) of the static image A is made available to the user automatically when it is requested. In this manner, the system is able to automatically process image data in anticipation of user demands.

At state 2 the current live camera image B is considered stationary relative to the static image A derived therefrom. In addition when at state 2, the image processing results performed at state 1 are made available for any use besides use by a user. Also periodically while in state 2, a transition is made to diamond 64 to determine whether a shift occurred between the static image A and the current live image B after at a predefined interval. If a shift occurred then a transition is made to state 0; otherwise, control returns to state 2. In general, the control system will tend to return towards state 2 when there is no detected motion by motion detection module 58.

In the event that motion is detected at either diamond 60 or 64 by motion detection module 58, the system transitions to state 0. In state 0, the current live image B which is continuously input into frame buffer 46B is copied into frame buffer 46A, which stores the static image A. The live image in frame buffer 46A is presented for display. In state 0, the previous OCR results are no longer considered to be valid and discarded, as the current live image B has changed.

A principal feature of this embodiment is that the modes are controlled automatically by the processor 40 in response to detected motion in the image (detected by motion detection program module 58). Whenever the system detects no motion in the image (i.e., by comparing the contents of the two frame buffers 46A and 46B), then the system is automatically switched to the live mode 54 (state 0). Whenever the system detects that the image is not stationary, then system switches automatically from the live mode 54 to the frozen mode 56, and image processing is commenced (state 1 and proceeding to state 2).

Therefore, in use, when an operator moves a new document into the field of view of the camera, the scanner system detects motion in the image and switches to the live mode 54 (states 0), enabling the operator to view a live image to ensure that the document is correctly positioned in the field of view of the camera. As soon as the document image is stationary, the system switches automatically to the frozen mode 56 (states 1 and 2), whereupon processing of the image is commenced.

Since the processing (at state 1) may take some time depending on the complexity of the operation(s) performed, there will be a short delay until the image processing results are made available (at state 2). However, since the processing starts immediately the recorded document image is detected to be stationary, then the processing is likely to be completed by the time the operator desires to use the results. Moreover, the processing is started at the earliest possible time (i.e., when the image becomes stationary), so that the operator experiences less of a delay than in the conventional method where the operator has to manually "freeze" the image and then wait for the processing to be completed.

A further advantage is that, from the point of view of image capture or scanning, the system is automatic and "hands-free" without requiring the operator to manually switch between the live and frozen modes. This provides a much more intuitive and seamless scanning operation.

If the operator adjusts the position of the document after it has been stationary, then the system automatically detects the motion and switches from the frozen mode 56 to the live mode 54, and back to the frozen mode 56 once the document is detected to be newly stationary. If the motion should occur during the image processing of the previous document image (i.e., the document was not stationary for sufficiently long to complete state 1), then the processing in state 1 is stopped, and then restarted once the newly stationary image is acquired at state 0. This ensures that the processing does not delay the system switching to the live mode 54 (state 0) when necessary, yet also ensures that processing (state 1) is carried out at the earliest opportunity when a newly stationary image is detected.

With the control method described above and illustrated in FIG. 6, if the position of the document is adjusted (i.e., motion is detected) after the processing has been completed (state 2), the previous processing results are assumed to be no-longer valid (state 0), and the most up-to-date image is fully re-processed (state 1). However, the previous processing results may actually be of use in certain situations such as when: (a) the motion detected is small (e.g., due to a nudge of the paper or a jitter of the desk); (b) the motion detected is due to a non-page object (e.g., such as a hand moving under the camera); or (c) the motion detected is cyclic, essentially returning the page to its original position.

In such cases, it may be possible to use the previous image processing results (i.e., before motion was detected), possibly with a position offset to accommodate small position changes of the document page. One embodiment of this alternate control method is set forth in FIG. 7. One aspect of this alternate embodiment is to analyze the detected motion, and to determine whether it is a large motion that renders the previous image processing results invalid or whether it is a small motion that enables the previous image processing results to be re-used (with a position adjustment as required). Reuse of the previous image processing results avoids having to re-process the image, and thereby avoids the potential processing delays associated with image processing.

Figure 7:
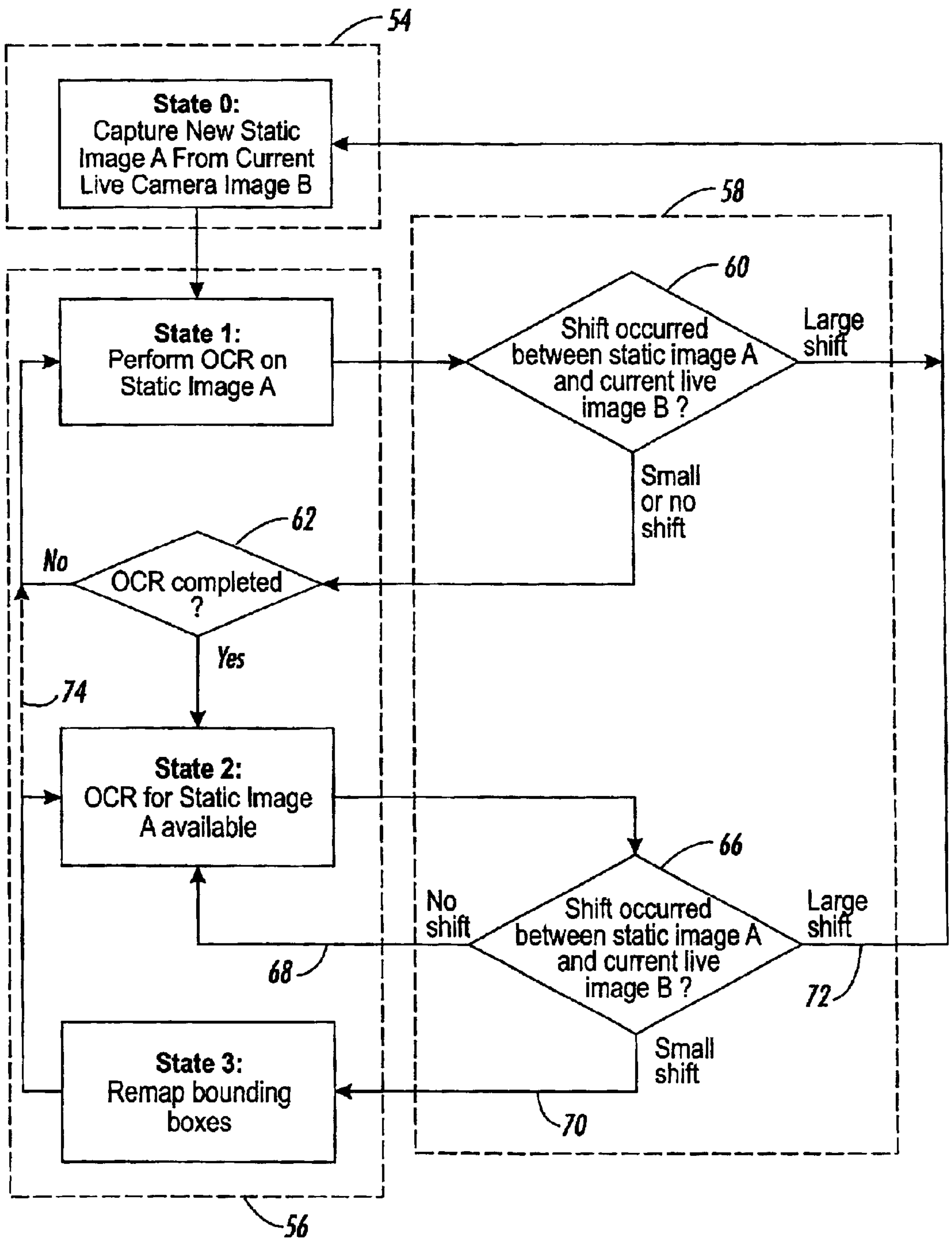
FIG. 7 is a schematic diagram illustrating the operating states in a second processing control method of the system of FIG. 3.

More specifically, the control method of FIG. 7 includes four operating states (labeled states 0–3). States 0, 1 and 2 correspond to the states described in FIG. 6, with state 2 being the stable state in frozen mode 56. When the motion detection module 58 detects motion at diamond 66, a decision is taken as to whether the motion is extremely small (i.e., almost none), small, or large at decision branches 68, 70, and 72 respectively. In one embodiment, these three decisions are defined using two threshold values of motion (e.g., motion is extremely small if detected motion is less than $T_1$; motion is small if detected motion is greater than or equal to $T_1$ yet less than $T_2$; and motion is large if detected motion is greater than or equal to $T_2$).

If the motion is determined by motion detection module 58 at diamond 66 is large at decision branch 72, then the system transitions from state 2 through large motion response to live mode 54 at state 0. When the image is subsequently detected to be newly stationary, the system then transitions to state 1, and ultimately back to state 2 once the desired image processing has been completed on the new image. Thus, as in the embodiment shown in FIG. 6, any large movement detected while in state 2 causes the system to transition back to state 0.

If the motion is determined by motion detection module 58 at diamond 66 is determined not to exist at decision branch 68, then the system transitions back to state 2 as in the embodiment shown in FIG. 6. However, in the event the motion detection module 58 at diamond 66 detects a small amount of motion, then the decision branch 70 is taken and the system transitions to small motion response module 64 at state 3. Once the re-mapping has completed at state 3, the system transitions back to state 2, in which the (re-mapped) image processing results are made available to the user.

The determination about whether an image shift is large (and requires an image to be re-processed at state 1) or small (and requires re-mapping at state 3) may be based on a plurality of parameters. For example, examples of such parameters include the amount of motion in the image, and whether the motion is uniform across the image. This determination ideally detects when the motion or change in the image can be tracked between images so as to enable the previous image processing results to be used for the current live image.

At state 3, the current live image B is analyzed to re-map the existing image processing results in image A to a new image A to correct the detected movement. In one embodiment, detected movement is identified with a position offset (i.e., translation). The re-mapping is then performed by adding the measured translation onto the top-left corner of the bounding box, assuming that bounding box is represented as top, left, width, and height. Assuming that the image shift is small, such re-mapping may be completed in far less time than would be required for reprocessing the current live image B at state 1.

In yet another embodiment, states 1 and 3 of the control process may be combined (or state 3 may lead to state 2 as indicated by broken line 74). In this alternate embodiment, regions of the image are determined as having large or small (or no) movement (i.e., shifts). For selected regions of the image where large movement is detected, image processing is performed at state 1 on any new regions (i.e., re-processed) in a new static image A' derived from the current live image B evaluated at diamond 66.

For regions of the image where small or no movement is detected, the previous image processing results are re-mapped for any previous portions of the image which are tracked during the page movement; otherwise, the previous image processing results are re-used without modification. The results from these three processing operations are coalesced into a new image and made available at state 2. Advantageously, this can reduce image processing performed (at state 0) to only those portions of the new image regions that cannot be identified as being based on the previous image, which are either re-used (at state 2) or re-mapped (at state 3).

In yet a further embodiment, a large mosaic of a document can be automatically assembled by storing previous image processing results and by adding the new image processing results thereto. Advantageously, this allows a document to be scanned which is larger than the field of view of the camera 30. For example, a document larger than the field of view of the camera can be scanned and mosaiced by moving it in small increments across the field of view of the camera 30. This provides a very intuitive technique for scanning documents without the operator having to manually freeze and unfreeze document images, and without the user having to manually "mosaic" captured images.

It will be appreciated that the image-motion-detection techniques described herein provide an improved tool for controlling the capture and processing of a document image using a camera, without requiring the user to manually switch the scanner between conventional live and frozen modes.

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

What is claimed is:

1. A document image capture system, comprising:

an input for receiving an image from a camera;

at least one image buffer for storing data representing an image frame;

an operating mode selector for receiving a selection between a live operating mode and a frozen operating mode;

a motion detector coupled to said at least one image buffer for processing said image to detect motion between sequential frames of said image, wherein said image is a current live image when said motion detector detects said motion between said sequential frames and said image is a frozen image otherwise;

an image processor coupled to said at least one image buffer for processing said image therein to extract document information from the image, said image processor processing said frozen image while in said frozen mode in accordance with a selected image processing operation and concurrently monitoring said current live image from said sequential frames; and a control device responsive to an output from said motion detector for controlling said image processor to begin processing when said motion detector detects that said image has become stationary after movement, wherein said live operating mode transitions to said frozen operating mode in response to said image in said sequential frames becoming frozen, and said frozen operating mode transitioning to the live operating mode in response to said motion detector detecting said motion between the frozen image and the current live image.

2. The document image capture system according to claim 1, wherein said control device is operable to halt said image processor if said motion detector detects image motion from said input while said image processor is performing image processing.

3. The document image capture system according to claim 1, wherein said at least one image buffer comprises a first buffer for storing a first frame of said image and a second buffer for storing a second frame of said image, and wherein said motion detector is operable to compare the contents of said first and second buffers to detect said motion between said frames of said image.

4. The document image capture system according to claim 1, wherein said motion detector is operable to determine whether said movement corresponds to a first type of motion and a second type of motion.

5. The document image capture system according to claim 4, wherein said first type of motion is motion quantified as being larger than a threshold value and said second type of motion is motion quantified to be less than or equal to the threshold value.

6. The document image capture system according to claim 4, wherein said control device is operable, in response to said motion detector detecting said movement to be said first type of motion, to control said image processor to perform optical character recognition on said image when said image becomes stationary.

7. The document image capture system according to claim 6, wherein said control device is operable, in response to said motion detector detecting said movement to be said second type of motion, to control said image processor to re-map previous optical character recognition results to said image when said image become stationary.

8. The document image capture system according to claim 7, wherein said control device is operable to freeze said image in said image buffer prior to controlling said image processor to begin image processing.

9. A method for automatically controlling a document image capture system that communicates with a camera that produces a sequence of live images, said method comprising:

defining a live operating mode and a frozen operating mode;

transitioning from the live operating mode to the frozen operating mode once an image from said sequential frames is frozen;

processing the frozen image while in the frozen mode in accordance with a selected image processing operation; and concurrently while in the frozen mode, monitoring a current live image from the sequence of live images to detect motion in the frozen image;

wherein processing results from the selected image processing operation are made available for further use when processing completes and a transition between the frozen mode to the live operating mode has not taken place; the frozen operating mode transitioning to the live operating mode once motion between the frozen image and the current live image is detected.

10. The method according to claim 9, wherein the transition from the frozen operating mode to the live operating mode occurs when changes in motion between the frozen image and the current live image exceed a first threshold of measured movement.

11. The method according to claim 10, further comprising re-mapping the results from the image processing operation that are made available which are less than the first threshold of measured movement and greater than a second threshold of measured movement; wherein the first threshold of measured movement is greater than the second threshold of measured movement.

12. The method according to claim 11, further comprising re-using the results from the image processing operation that are made available which are less than the second threshold of measured movement.

13. The method according to claim 12, further re-processing selected regions of the results from the image processing operation that are greater than the first threshold of measured movement.

14. The method according to claim 13, further comprising coalescing any re-mapped results, re-used results, and re-processed results to update the processing results from the selected image processing operation.

15. The method according to claim 11, wherein the selected image processing operation is OCR.

16. The method according to claim 10, further comprising:

storing results from the selected image processing operation after each transition from the frozen operating mode to the live operating mode; and creating a mosaic of the stored results.

17. The method according to claim 9, further comprising:

displaying the sequence of live images on an output device when in the live operating mode; and displaying the frozen image on the output device when in the frozen operating mode.

18. A method for automatically controlling a document image capture system that communicates with a camera providing a sequence of images, said method comprising:

performing first image analysis of a first image from the sequence of images to extract document information therefrom;

performing second image analysis of said first image and a second subsequent image to detect motion between said first image to said second subsequent image, and to detect a mapping correlation between said first image and said second subsequent image; and mapping said extracted document information from said first image to said second subsequent image, to represent extracted document information corresponding to said second subsequent image;

wherein said second image analysis comprises determining whether said motion in said image from said first image to said second subsequent image exceeds a motion threshold, and mapping said extracted document information only if said motion does not exceed said motion threshold; and wherein said first image analysis is performed on said second subsequent image if said motion exceeds said threshold.

19. The method according claim 18, wherein said first image analysis comprises optical character recognition of text in said image, and wherein said document information comprises decoded data derived from said optical character recognition.

20. The method according to claim 19, further comprising:

identifying text in said second subsequent image which text is not in said first image;

performing said first image analysis on said identified text in said second subsequent image to generate newly extracted information from said identified text; and combining said mapped extracted information from said first image and said newly extracted information, to represent extracted document information corresponding to said second subsequent image.

* * * * *